US006975520B2

(12) United States Patent
Sugimoto

(10) Patent No.: US 6,975,520 B2
(45) Date of Patent: Dec. 13, 2005

(54) DC-DC CONVERTER HAVING STABLE INPUT VOLTAGE

(75) Inventor: Takashi Sugimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 10 days.

(21) Appl. No.: 10/369,555

(22) Filed: Feb. 21, 2003

(65) Prior Publication Data
US 2004/0070995 A1  Apr. 15, 2004

(30) Foreign Application Priority Data
Oct. 9, 2002  (JP) ............................. 2002-296130

(51) Int. Cl.[7] .......................................... H02M 3/335
(52) U.S. Cl. .................. 363/21.01; 363/97; 363/21.03
(58) Field of Search ............................. 363/20, 21.01, 363/21.02, 21.03, 97

(56) References Cited

U.S. PATENT DOCUMENTS

| 6,125,046 A | * | 9/2000 | Jang et al. ............... 363/21.15 |
| 6,304,473 B1 | * | 10/2001 | Telefus et al. ................ 363/97 |
| 6,344,981 B1 | * | 2/2002 | Norton et al. ........... 363/21.01 |
| 6,344,986 B1 | * | 2/2002 | Jain et al. ...................... 363/89 |
| 6,529,389 B2 | * | 3/2003 | Perlick et al. ................ 363/20 |
| 6,665,197 B2 | * | 12/2003 | Gong et al. .............. 363/21.01 |
| 6,693,810 B2 | * | 2/2004 | Robinson et al. ............. 363/97 |

FOREIGN PATENT DOCUMENTS

| JP | 03-036958 | 2/1991 |
| JP | 06-185440 | 7/1994 |
| JP | 2927128 | 5/1999 |

* cited by examiner

*Primary Examiner*—Bao Q. Vu
(74) *Attorney, Agent, or Firm*—Sughrue Mion, PLLC

(57) ABSTRACT

Provided is a DC-DC converter which is capable of obtaining a stable output irrespective of the fluctuation of the power source voltage and ensuring the reliability of a device. The DC-DC converter configured such that a current of a primary coil of a boosting transformer supplied from a power source unit is intermittently caused to flow through the converter by a power MOS-FET and an ignition capacitor is charged with electricity through a rectifier diode using the voltage of a secondary coil of the boosting transformer boosted by the flyback voltage of a coil, includes a current detecting circuit for detecting a drain current of the power MOS-FET, and a control circuit for, when the drain current detected by the current detecting circuit exceeds a predetermined threshold, turning off the power MOS-FET for a fixed period of time, and then turning on the power MOS-FET again.

3 Claims, 6 Drawing Sheets

DC-DC CONVERTER HAVING STABLE INPUT VOLTAGE

BACKGROUND OF THE INVENTION

1. Field of the Invention

The present invention relates in general to a DC-DC converter for use in a CDI (Capacitor Discharge Ignition) unit for automobiles, two-wheeled vehicles, or outboard motors, and more particularly to suppression of remarkable increase and decrease in output due to the fluctuation of a power source voltage.

2. Description of the Related Art

A separately excited DC-DC converter using an oscillation power MOS-FET in switching on the primary side of a transformer is used as a boosting circuit for charging an ignition capacitor with electricity in an ignition device for charging one pole of the above-mentioned ignition capacitor for accumulating therein the ignition energy which is provided on the primary side of an ignition coil to discharge the electric charges in the capacitor through a primary coil of the ignition coil during the ignition period to induce a high voltage for ignition in a secondary coil of the ignition coil. This DC-DC converter operates to carry out the oscillation and boosting therein by supplying an oscillation signal to a gate of a power MOS-FET from an oscillation circuit provided in order to obtain a desired frequency (e.g. refer to Patent Document 1)

[Patent Document 1]

JP 2927128 B (FIGS. 1 and 4)

However, a power source unit for automobiles, two-wheeled vehicles, or outboard motors can not necessarily supply a stable voltage to a DC-DC converter. Thus, the power source voltage may be increased or decreased depending on the state of the batteries used as the power source unit. In particular, the batteryless system is present in two-wheeled vehicles and hence only the completely unstable power source may be expected in some cases.

While when the power source voltage has been high in the separately excited DC-DC converter using a MOS-FET, the ramp of a drain current ID becomes large, since the MOS-FET is not turned off until a predetermined time is reached, a larger drain current ID is caused to flow through the MOS-FET as compared with the period of the normal power source voltage. In this case, the power of the converter is increased more than is required in the normal operation so that there is increased the danger of bringing about the thermal breakdown or the like of the device.

On the other hand, though when the power source voltage is low, the ramp of the drain current ID becomes small and thus the sufficient drain current ID is not caused to flow through the MOS-FET, the MOS-FET is turned off when the predetermined time is reached so that the output of the converter is remarkably reduced.

In addition, when starting to charge the ignition capacitor with electricity, the switching power MOS-FET is turned on before the energy generated on the primary side is sufficiently transmitted to the secondary side. Thus, during turn-on, some drain current ID is caused to flow through the MOS-FET, whereby during turn-off, the value of the drain current ID becomes larger than that in the normal operation to increase the calorification. Then, if the calorification exceeds the specification of the MOS-FET, the MOS-FET will be broken down.

SUMMARY OF THE INVENTION

In the light of the foregoing, the present invention pays attention to the above-mentioned problems. Therefore, it is an object of the present invention to obtain a DC-DC converter which is capable of obtaining a stable output irrespective of the fluctuation of the power source voltage and also of ensuring the reliability of a device.

A DC-DC converter according to the present invention is configured such that a current of a primary coil of a boosting transformer which is supplied from a power source unit is intermittently caused to flow through the converter by a power MOS-FET and an ignition capacitor is charged with electricity through a rectifier diode using a voltage of a secondary coil of the boosting transformer boosted by a flyback voltage of a coil. Further, the DC-DC converter is characterized by including a current detecting unit for detecting a drain current of the power MOS-FET, and a control unit for, when the drain current detected by the current detecting unit exceeds a predetermined threshold, turning off the power MOS-FET for a fixed period of time, and then turning on the power MOS-FET again.

BRIEF DESCRIPTION OF THE DRAWINGS

The foregoing and other objects are effected by the invention as will be apparent from the following description and claims taken in connection with the accompanying drawings, forming a part of this application, in which:

DETAILED DESCRIPTION OF THE PREFERRED EMBODIMENTS

The preferred embodiments of the present invention will hereinafter be described in detail with reference to the accompanying drawings.

Figure 1:
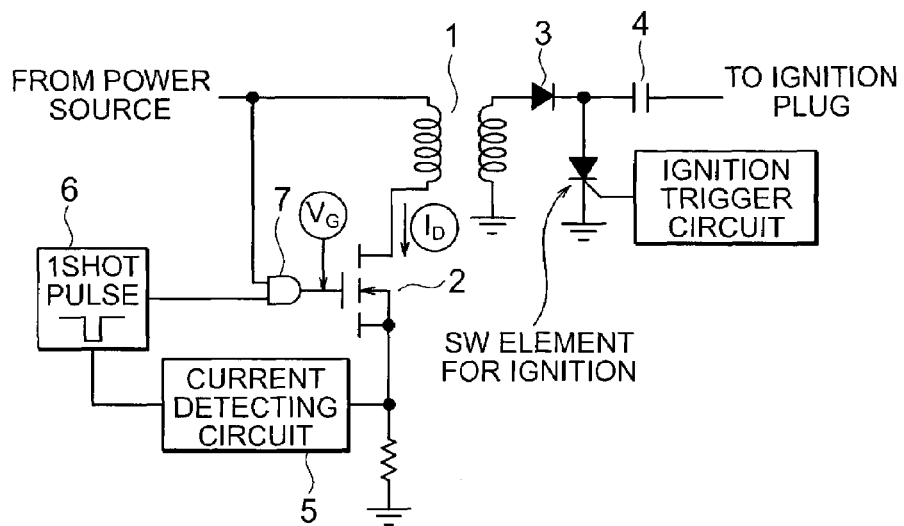
FIG. 1 is a circuit diagram showing a configuration of a DC-DC converter according to the present invention.

FIG. 1 is a circuit diagram showing a configuration of a DC-DC converter according to the present invention. The DC-DC converter shown in FIG. 1 is the DC-DC converter configured in such a way that a current of a primary coil of a boosting transformer 1 which is supplied from a power source unit is intermittently caused to flow through the converter by a power MOS-FET 2 and an ignition capacitor 4 is charged with electricity through a rectifier diode 3 using a voltage of a secondary coil of the boosting transformer 1 boosted by a flyback voltage of a coil, in which for the oscillation of the power MOS-FET 2, when a drain current ID of the power MOS-FET 2 exceeds a certain threshold, the power MOS-FET 2 is turned off for a fixed period of time, and then it is turned on again, thereby avoiding the extreme increase in output when the power source voltage is high and the extreme decrease in output when the power source voltage is low.

That is to say, the DC-DC converter includes: a current detecting circuit 5 for detecting the drain current ID of the power MOS-FET 2 as a current detecting unit; a one-shot pulse outputting circuit 6 for, when a current value detected by the current detecting circuit 5 exceeds the threshold, outputting a down one-shot of a rectangular pulse with that time point as a trigger as a control unit; and an AND circuit 7 for on the basis of the logical product of an output of the one-shot pulse outputting circuit 6 and a signal supplied from the power source unit, supplying a voltage VG used to drive a gate of the power MOS-FET 2.

Figure 2A:
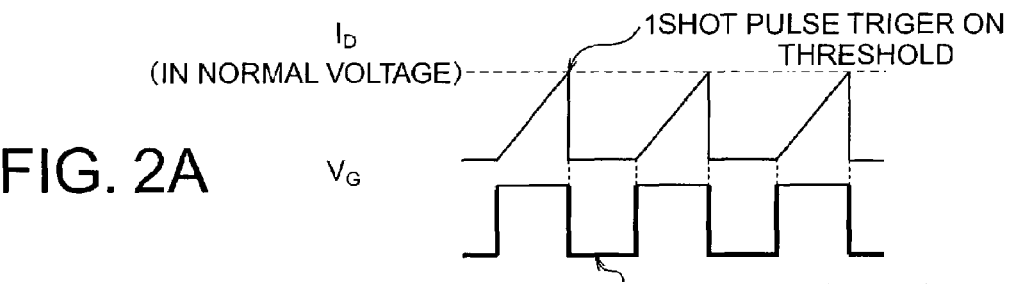
FIGS. 2A to 2C are respectively timing charts showing a method of driving a power MOS-FET 2 in the normal voltage, the high voltage, and the low voltage of the DC-DC converter shown in FIG. 1.
Figure 2B:
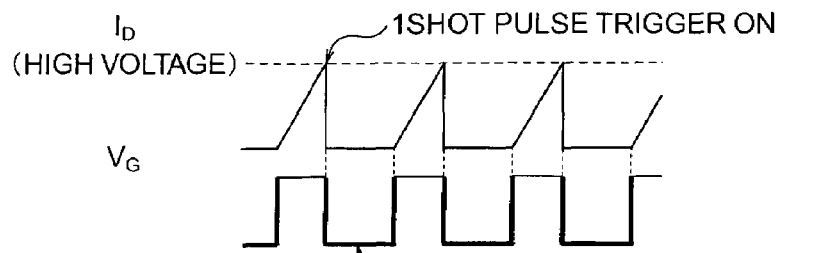
Figure 2C:
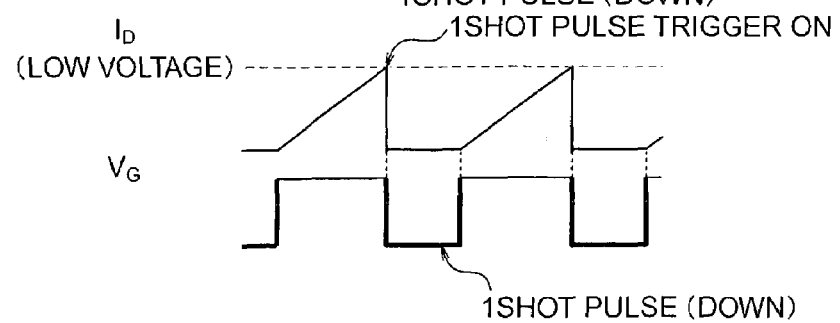

FIGS. 2A to 2C are respectively timing charts showing a method of driving the power MOS-FET 2 in the normal voltage, the high voltage, and the low voltage of the DC-DC converter shown in FIG. 1. As shown in FIGS. 2A to 2C, at the time when the drain current ID of the power MOS-FET 2 exceeds a threshold, a down one-shot pulse is supplied as a gate voltage VG, and with respect to an over-current as well in starting the charge to the secondary side, it is possible to prevent the drain current ID from becoming equal to or larger than the threshold.

Figure 3:
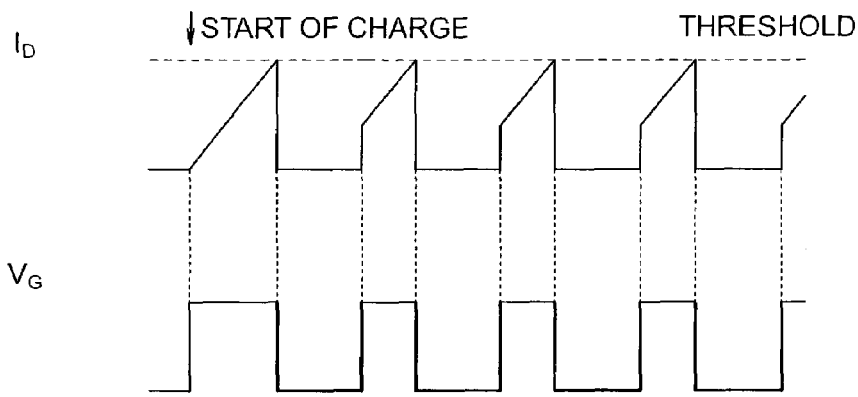
FIG. 3 is a diagram useful in explaining a drain current ID and a gate voltage VG when starting charge in the DC-DC converter shown in FIG. 1.

FIG. 3 shows the drain current ID and the gate voltage VG in starting the charge. As shown in FIG. 3, at the time when the drain current ID is gradually increased to reach the threshold, the gate voltage VG generated due to the down one-shot pulse is supplied to the gate of the power MOS-FET 2.

Figure 4:
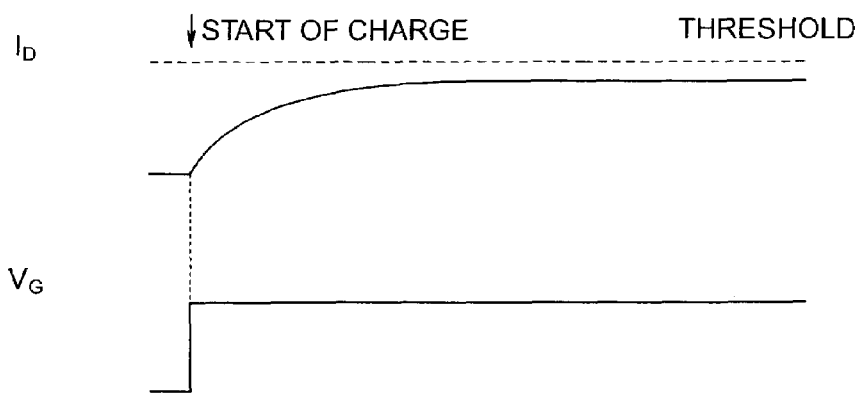
FIG. 4 is a diagram useful in explaining the drain current ID and the gate voltage VG when starting charge in the DC-DC converter shown in FIG. 1.

Now, in this method, when the MOS-FET 2 can not be sufficiently turned on in the low voltage, as shown in FIG. 4, the drain current ID may be saturated without being increased up to the threshold in some cases. In such cases, there is no means for turning off the MOS-FET 2 and hence the drain current ID continues to be caused to flow. Thus, there is the danger that the calorification and breakdown of the device may be brought about.

In order to prevent this, in the present invention, the on-time of the MOS-FET 2 is limited and even if the drain current ID does not yet reach the threshold, after a lapse of a fixed period of time, the MOS-FET 2 is turned off to prevent the above-mentioned thermal breakdown.

Figure 5:
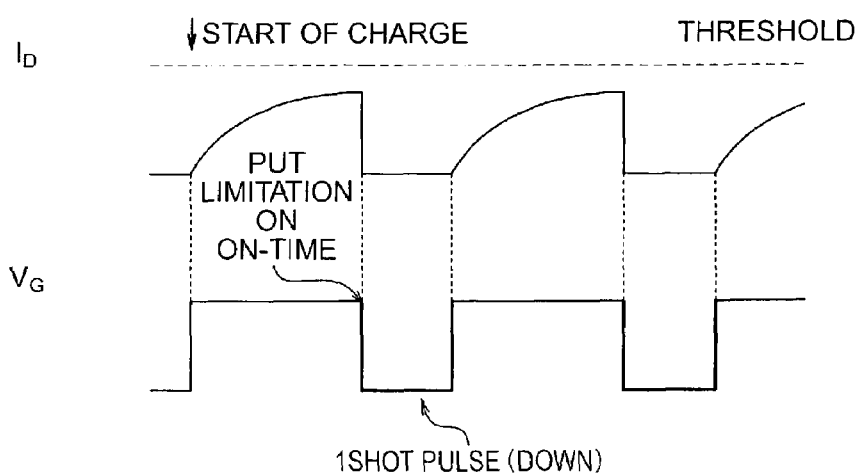
FIG. 5 is a diagram useful in explaining the drain current ID and the gate voltage VG when starting charge in the DC-DC converter shown in FIG. 1.

FIG. 5 shows the drain current and the gate voltage VG in starting the charge. As shown in FIG. 5, while the drain current ID is gradually increased in starting the charge, when it does not yet reach the threshold (in the low voltage), the down one-shot pulse is supplied so as to supply the gate voltage VG used to limit the on-time of the MOS-FET 2. Then, even if the drain current ID does not yet reach the threshold, after a lapse of a fixed period of time, the MOS-FET 2 is turned off, thereby preventing the MOS-FET 2 from continuing to be turned on to cause the drain current ID to flow whatever state the MOS-FET 2 is saturated to.

Figure 6:
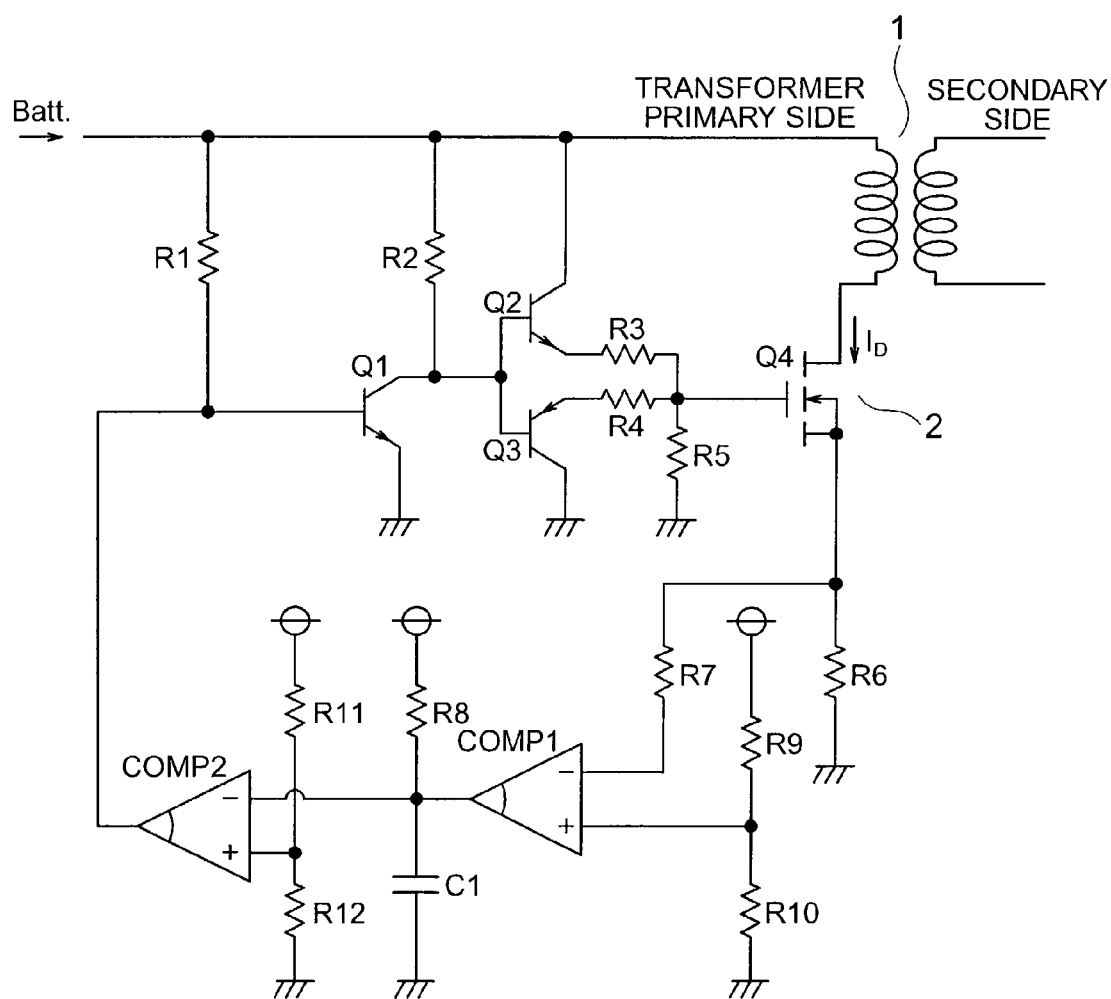
FIG. 6 is a circuit diagram showing a DC-DC converter according to a first embodiment of the present invention.

The description will hereinbelow be given with respect to an example of a concrete circuit configuration. FIG. 6 is a circuit diagram showing a DC-DC converter according to a first embodiment. In the DC-DC converter shown in FIG. 6, batteries Batt are used as the power source unit, and a power MOS-FET (MOS-FET) 2 connected to the primary side of a boosting transformer 1 is grounded through a resistor R6. In addition, in order to detect the drain current ID, the power MOS-FET 2 is connected to a (−) terminal of a first comparator COMP1 through a resistor R7, and a (+) terminal of the first comparator COMP1 is connected to a voltage division point between voltage division resistors R9 and R10. An output of the first comparator COMP1 is connected to a (−) terminal of a second comparator COMP2 through a connection point between a resistor R8 and a capacitor C1, and a (+) terminal of the second comparator COMP2 is connected to a voltage division point between division voltage resistors R11 and R12.

Moreover, an output terminal of the second comparator COMP2 is connected to a base of a transistor Q1 which is connected to the batteries Batt (the primary side of the boosting transformer) through a resistor R1, a resistor R2 is provided between a collector of the transistor Q1 and the batteries Batt, and an emitter of the transistor Q1 is grounded. In addition, the collector of the transistor Q1 is connected to each of bases of transistors Q2 and Q3, a collector of the transistor Q2 is connected to the batteries Batt (the primary side of the boosting transformer) and an emitter of the transistor Q2 is connected to a gate of the power MOS-FET 2 through a resistor R3. In addition, a collector of the transistor Q3 is grounded, and an emitter of the transistor Q3 is connected to the gate of the power MOS-FET 2 through a resistor R4. Also, the gate of the power MOS-FET 2 is grounded through a resistor R5.

Figure 7:
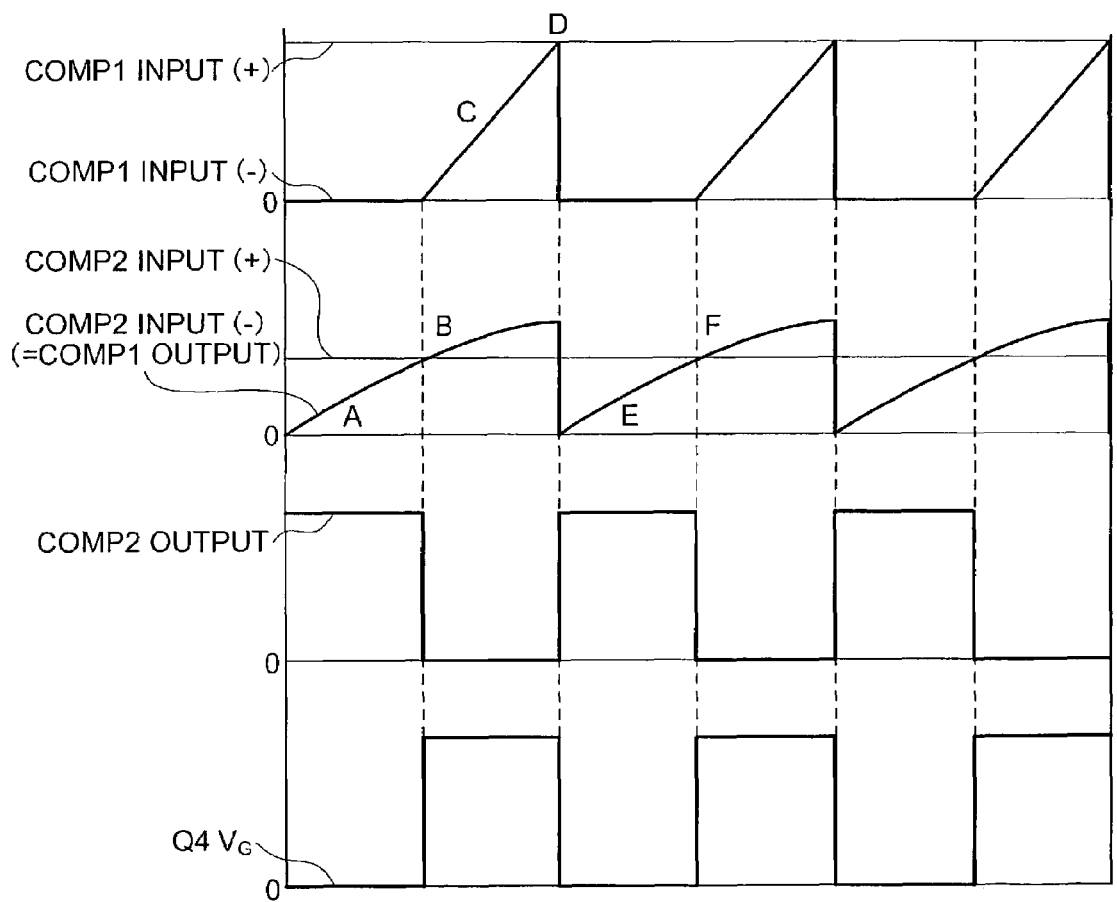
FIG. 7 is a timing chart showing electric potentials of respective devices in FIG. 6.

Next, FIG. 7 is a timing chart showing electric potentials of the respective devices shown in FIG. 6. Since right after application of the power source, the drain current ID caused to flow the MOS-FET 2 is 0[A], the electric potential at the input terminal INPUT(−) of the first comparator COMP1 is also 0. Consequently, while the electric potential at the output terminal OUTPUT of the first comparator COMP1, i.e., at the input terminal INPUT(−) of the second comparator COMP2 is intended to be High, since the capacitor C1 carries out the part of an integration circuit, the electric potential at the input terminal INPUT(−) of the second comparator COMP2 is gradually increased (refer to A shown in FIG. 7).

Since for a period of time when the electric potential at the input terminal INPUT(−) of the second comparator COMP2 is lower than that at the input terminal INPUT(+) thereof, the electric potential at the output terminal OUTPUT of the second comparator COMP2 is High and the gate voltage VG of the MOS-FET 2 becomes Low, whereby the MOS-FET is held in the off state.

In a short time, the electric potential at the input terminal INPUT(−) of the second comparator COMP2 exceeds the electric potential at the input terminal INPUT(+) thereof (refer to B shown in FIG. 7), and the electric potential at the output terminal OUTPUT of the second comparator COMP2 becomes 0. Then, since the gate voltage VG of the MOS-FET 2 becomes High, and hence the drain current ID caused to flow through the MOS-FET 2 is gradually increased, the electric potential at the input terminal INPUT(−) of the first comparator COMP1 is increased along therewith (refer to C shown in FIG. 7).

At the time when the electric potential at the input terminal INPUT(−) of the first comparator COMP1 exceeds the electric potential at the input terminal INPUT(+) thereof (refer to D shown in FIG. 7), since the electric potential at the output terminal OUTPUT of the first comparator COMP1, i.e., at the input terminal INPUT(−) of the second comparator COMP2 is decreased down to 0, the electric potential at the output terminal OUTPUT of the second comparator COMP2 is High and the gate voltage VG of the MOS-FET 2 becomes Low, whereby the MOS-FET 2 is turned off.

Since the MOS-FET 2 is turned off and the drain current ID becomes 0[A], the electric potential at the input terminal INPUT(−) of the first comparator COMP1 becomes lower than that at the input terminal INPUT(+) thereof again, and the electric potential at the output terminal OUTPUT of the second comparator COMP2 is intended to be High. However, similarly to the foregoing, the electric potential thereat is not immediately increased due to the provision of the capacitor C1, but is gradually increased.

At the time when the electric potential at the input terminal INPUT(−) of the second comparator COMP2 exceeds the electric potential at the input terminal INPUT(+) thereof again (refer to F shown in FIG. 7), similarly to the foregoing, the MOS-FET 2 is turned on again.

By carrying out repeatedly the above-mentioned process, the MOS-FET 2 is turned on and hence the drain current ID is increased to exceed a certain threshold, and after the MOS-FET 2 is held in the off state for a fixed period of time, it is turned on again to carry out the oscillation and the boosting.

Figure 8:
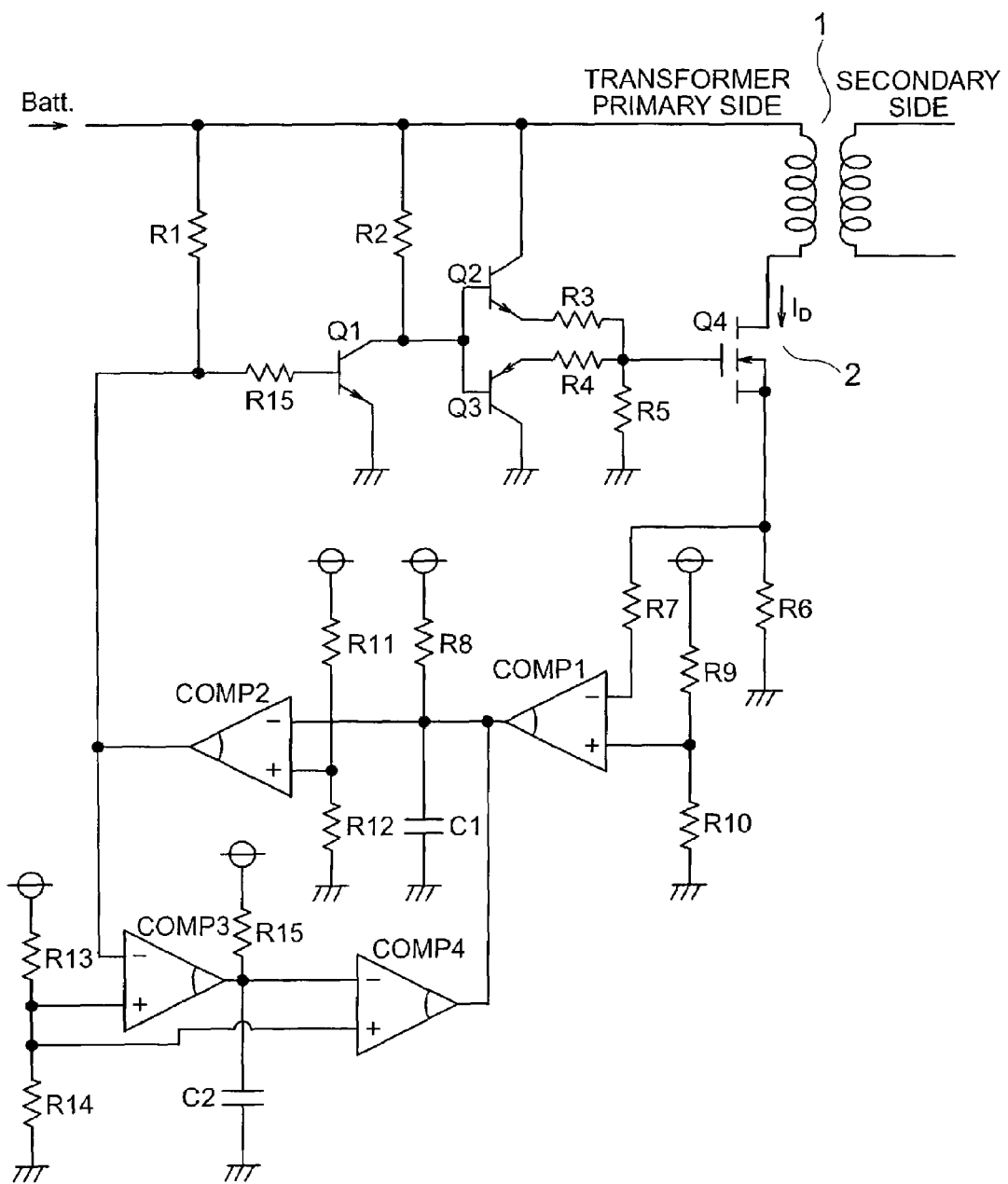
FIG. 8 is a circuit diagram showing a DC-DC converter according to a second embodiment of the present invention.

Next, FIG. 8 is a circuit diagram showing a DC-DC converter according to a second embodiment. In the DC-DC converter shown in FIG. 8, the following constituent elements are further added to the configuration of the DC-DC converter according to the first embodiment shown in FIG. 6. That is to say, the DC-DC converter of the present embodiment further includes a third comparator COMP3 having an input terminal (−) connected to the output terminal of the second comparator COMP2 and an input terminal (+) connected to a voltage division point between voltage division resistors R13 and R14, and a fourth comparator COMP4 having an input terminal (−) connected to an output terminal of the third comparator COMP3 through a connection point between a resistor R15 and a capacitor C2, an input terminal (+) connected to a voltage division point between voltage division resistors R13 and R14, and an output terminal connected to the input terminal of the first comparator COMP1.

The DC-DC converter according to the above-mentioned first embodiment shown in FIG. 6 is such that when the drain current ID is saturated without being increased up to the threshold in the case where the power source voltage is low and hence the MOS-FET 2 can not be sufficiently turned on, the drain current ID continues to be caused to flow through the MOS-FET 2 without turning off the MOS-FET 2. Then, in the DC-DC converter shown in FIG. 8, a circuit for preventing the MOS-FET 2 from settling in the on state is added to the DC-DC converter shown in FIG. 6.

Figure 9:
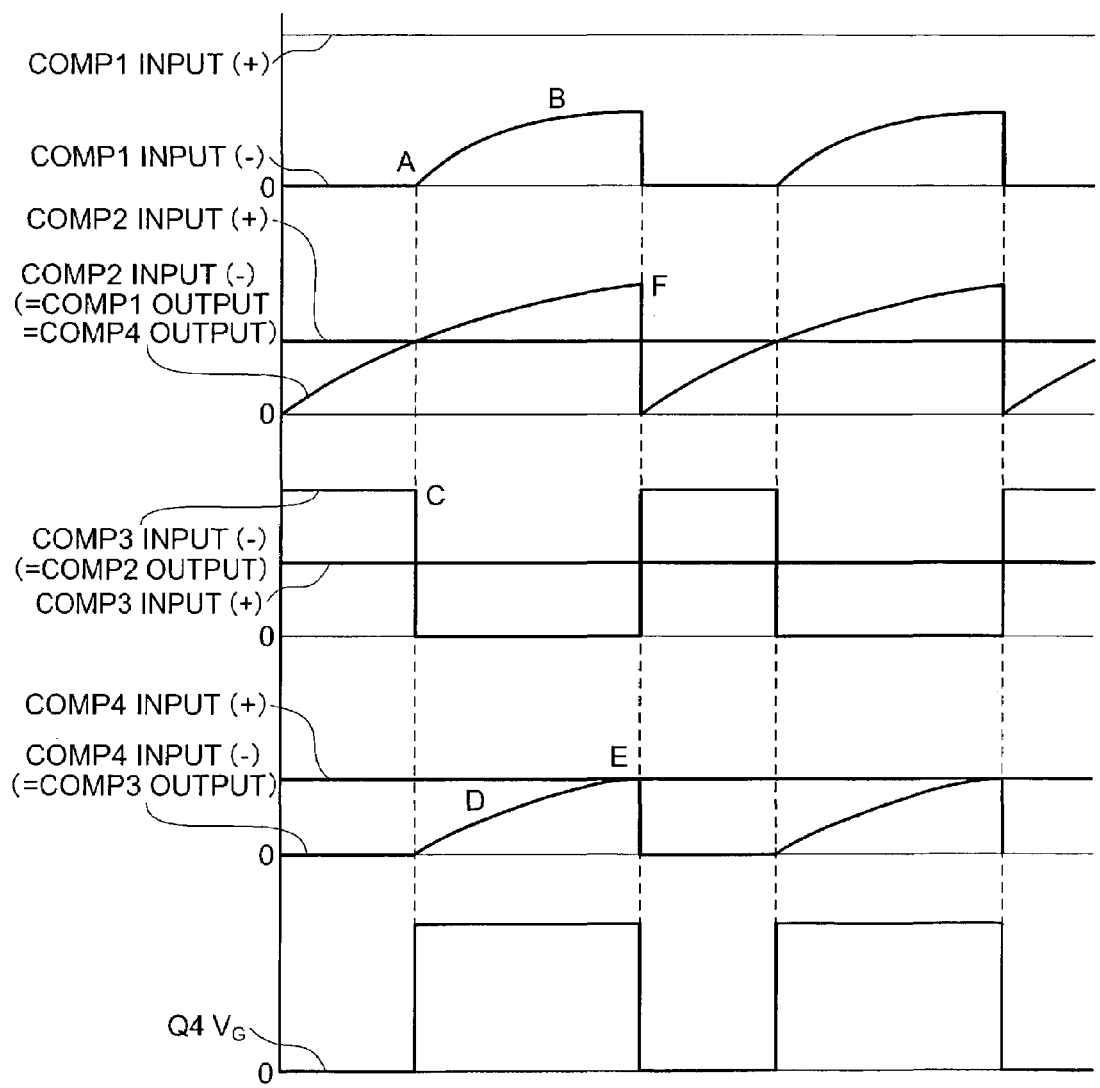
FIG. 9 is a timing chart showing electric potentials of respective devices in FIG. 8.

FIG. 9 is a timing chart concerned with the DC-DC converter shown in FIG. 8 when the power source voltage is low. In FIG. 9, at the time when the power source is applied, similarly to the case of FIG. 7, the drain current ID begins to be caused to flow through the MOS-FET 2 (refer to A shown in FIG. 9). However, since in FIG. 9, the power source voltage is low, the sufficient drain current is not caused to flow through the MOS-FET 2 and hence as shown in B, the electric potential at the input terminal INPUT(−) of the first comparator COMP1 does not exceed the electric potential at the input terminal INPUT(+) thereof.

The DC-DC converter in FIG. 9 includes the mechanism for generating one-shot pulse at a time point when the drain current begins to be caused to flow, i.e., a time point when the signal level at the output terminal OUTPUT of the second comparator COMP2 falls (refer to C shown in FIG. 9) as a trigger to turn off the MOS-FET 2 at the end of this pulse.

Since at the time when the signal level at the output terminal OUTPUT of the second comparator COMP2, i.e., the signal at the input terminal INPUT(−) of the third comparator COMP3 falls (refer to C shown in FIG. 9), its electric potential is lower than that at the input terminal INPUT(+) thereof, and thus the signal level at the output terminal OUTPUT of the third comparator COMP3, i.e., the signal level at the input terminal INPUT(−) of the fourth comparator COMP4 is intended to be High. However, the electric potential thereat is gradually increased due to the effect of the integration circuit having the capacitor C3 (refer to D shown in FIG. 9).

Since at the time when the electric potential at the input terminal INPUT(−) of the fourth comparator COMP4 exceeds the electric potential at the input terminal INPUT(+) thereof (refer to E shown in FIG. 9), the electric potential at the output terminal OUTPUT of the fourth comparator COMP4 falls to Low (refer to F shown in FIG. 9), and thus the electric potential at the input terminal INPUT(−) of the second comparator COMP2 is lower than that at the input terminal INPUT(+) thereof, the electric potential at the output terminal OUTPUT of the second comparator COMP2 becomes High and the gate voltage VG of the MOS-FET 2 becomes Low to turn off the MOS-FET 2. Thereafter, similarly to FIG. 7, after a lapse of a fixed period of time, the MOS-FET 2 is turned on again. By repeatedly carrying out this process, it is possible to prevent the drain current from continuing to be caused to flow even when the drain current of the MOS-FET 2 is not sufficiently caused to flow.

As set forth hereinabove, according to the present invention, since a drain current is detected and at the time when the drain current reaches a certain threshold, a MOS-FET is turned off with that time point as a trigger, a fixed drain current can be caused to flow irrespective of the magnitude of a power source voltage to obtain a stable output and also to ensure the reliability of the device.

As many apparently widely different embodiments of this invention may be made without departing from the spirit and scope thereof, it is to be understood that the invention is not limited to the specific embodiments thereof except as defined in the appended claims.

What is claimed is:

1. A DC-DC converter configured such that a current of a primary coil of a boosting transformer which is supplied from a power source unit is intermittently caused to flow through said converter by a power MOS-FET, and an ignition capacitor is charged with electricity through a rectifier diode using a voltage of a secondary coil of said boosting transformer boosted by a flyback voltage of a coil, said current naturally flowing to the power MOS-FET, and said DC-DC converter comprising:

a current detecting unit for detecting a drain current of said power MOS-FET; and a control unit having a one-shot pulse outputting circuit for, when a current value detected by said current detecting unit exceeds a predetermined threshold, outputting a down one-shot with that time point as a trigger, and an AND circuit for, on the basis of the logical product of an output of said one-shot pulse outputting circuit and a signal supplied from said power source unit, supplying a voltage used to drive a gate of said power MOS-FET;

wherein said control unit, when the drain current detected by said current detecting unit exceeds a predetermined threshold, turning off said power MOS-FET for a fixed period of time, and then turning on said power MOS-FET again.

2. A DC-DC converter according to claim 1, wherein said control unit sets a period of time for limiting the time during which said power MOS-FET is continued to be turned on when the drain current detected by said current detecting unit does not exceed the predetermined threshold, and turns off said power MOS-FET after a lapse of the period of time thus set for the on state of said power MOS-FET.

3. A power supply circuit comprising:
a boosting transformer including a primary coil having a current supplied from a power source unit;
a power MOS-FET, naturally receiving the current, and intermittently causing the current to flow through a DC-DC converter; and
an ignition capacitor charged with electricity through a rectifier diode using a voltage of a secondary coil of said boosting transformer boosted by a flyback voltage of a coil, said converter comprising:
a current detecting unit for detecting a drain current of said power MOS-FET; and
a control unit having a one-shot pulse outputting circuit for, when a current value detected by said current detecting unit exceeds a predetermined threshold, outputting a down one-shot with that time point as a trigger, and an AND circuit for, on the basis of the logical product of an output of said one-shot pulse outputting circuit and a signal supplied from said power source unit, supplying a voltage used to drive a gate of said power MOS-FET.

* * * * *